US005193657A

United States Patent [19]

Iizuka

[11] Patent Number: 5,193,657

[45] Date of Patent: Mar. 16, 1993

[54] EXHAUST BRAKING CONTROL APPARATUS

[75] Inventor: Naonori Iizuka, Shizuoka, Japan

[73] Assignee: Jatco Corporation, Japan

[21] Appl. No.: 840,271

[22] Filed: Feb. 24, 1992

[30] Foreign Application Priority Data

Mar. 7, 1991 [JP] Japan .................................. 3-067873
Mar. 25, 1991 [JP] Japan .................................. 3-084787

[51] Int. Cl.$^5$ .............................................. B60K 41/20

[52] U.S. Cl. .................................. 192/1.23; 123/323; 364/426.04

[58] Field of Search .................... 192/1.21, 1.23, 1.24, 192/1.25; 60/603; 123/323; 364/426.01, 426.04; 188/273

[56] References Cited

U.S. PATENT DOCUMENTS 2,895,571 7/1959 Hanebeck ...................... 192/1.25 X
2,947,392 8/1960 Heine .............................. 123/323 X
4,106,584 8/1978 Matsubara ...................... 123/323 X
4,220,008 9/1980 Wilber et al. ................... 123/323 X
4,669,435 6/1987 Furusawa et al. .................. 123/323
4,765,201 8/1988 Ishiguro et al. ............... 192/1.23 X
5,003,483 3/1991 Hedstrom ...................... 192/1.23 X

FOREIGN PATENT DOCUMENTS 0268941 11/1988 Japan .................................. 123/323

*Primary Examiner*—Rodney H. Bonck
*Attorney, Agent, or Firm*—Ronald P. Kananen

[57] ABSTRACT

An exhaust braking control apparatus includes a control valve situated for movement within an engine exhaust passage to control exhaust gas flow from the engine to the atmosphere. A control unit is provided to set the control valve at a position to provide a continuously variable degree of exhaust braking effect based upon vehicle operating conditions. In another aspect, the control unit is arranged to move the control valve in a closing direction to provide an exhaust braking effect only under specified vehicle operating conditions.

10 Claims, 6 Drawing Sheets

EXHAUST BRAKING CONTROL APPARATUS

BACKGROUND OF THE INVENTION

This invention relates to an exhaust braking control apparatus for controlling exhaust gas flow through an engine exhaust passage to provide an engine braking effect It is the current practice to increase an engine braking effect by using a control valve to close the engine exhaust passage, causing the engine to operate like a compressor. However, such a prior art exhaust braking control apparatus can operate only in two modes. In the first mode, the exhaust braking control apparatus sets the control valve at its fully-open position permitting free exhaust gas flow to the atmosphere, and in the second mode, the exhaust braking control apparatus sets the control valve is at its fully-closed position to provide exhaust braking. It is, therefore, impossible to provide an appropriate degree of engine braking effect over the entire range of vehicle operating conditions.

SUMMARY OF THE INVENTION

It is a main object of the invention to provide an improved exhaust braking control apparatus which can provide an appropriate degree of engine braking effect over the entire range of vehicle operating conditions.

There is provided, in accordance with the invention, an exhaust braking control apparatus for use with an automotive vehicle having an engine, and an exhaust passage through which exhaust gases are discharged from the engine to the atmosphere. The exhaust braking control apparatus comprises a control valve situated for movement between a fully-open position and a fully-closed position within the exhaust passage to control exhaust gas flow through the exhaust passage, and sensors sensitive to vehicle operating conditions for producing sensor signals indicative of sensed vehicle operating conditions. The sensors are coupled to a control unit for setting the control valve at a position to provide a continuously variable degree of exhaust braking effect based upon the sensed vehicle operating conditions.

In another aspect of the invention, the exhaust braking control apparatus comprises a control valve situated for movement between a fully-open position and a fully-closed position within the exhaust passage to control exhaust gas flow through the exhaust passage, and sensors sensitive to vehicle operating conditions for producing sensor signals indicative of sensed vehicle operating conditions. The sensors are coupled to a control unit. The control unit includes first means for producing a command signal based upon the sensed vehicle operating conditions, and a second means responsive to the command signal for moving the control valve in a closing direction to provide exhaust braking effect.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
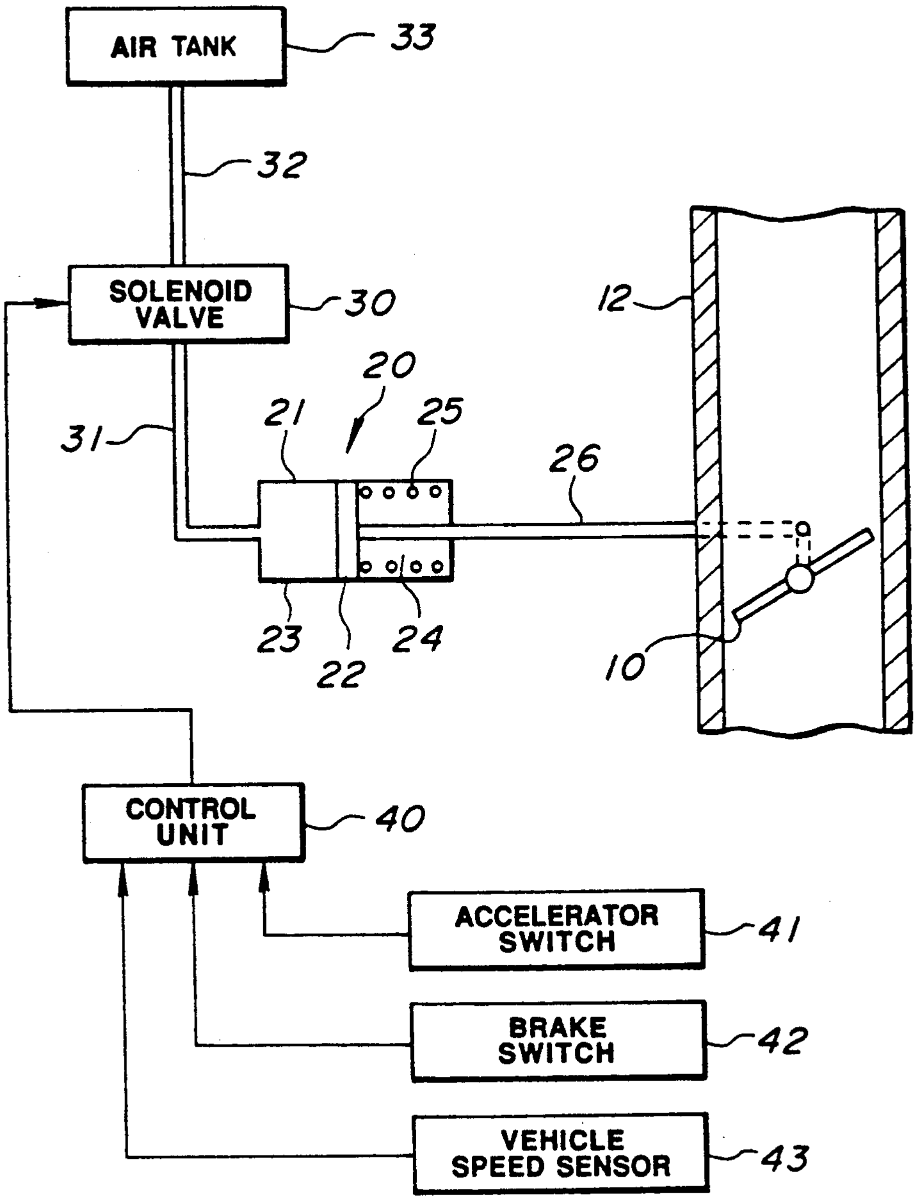
FIG. 1 is a schematic diagram showing one embodiment of an exhaust braking control apparatus made in accordance with the invention.

With reference to the drawings, and in particular to FIG. 1, there is shown a schematic diagram of an exhaust braking control apparatus embodying the invention. The exhaust braking control apparatus includes an exhaust braking system in the form of a butterfly valve 10 situated within an engine exhaust passage 12 between a fully-open position and a fullyclosed position for controlling the amount of exhaust gases discharged from the engine (not shown) to the atmosphere. Normally, the butterfly valve 10 is in its fully-open position to permit free flow of exhaust gases through the exhaust passage 12. In the fullyclosed position of the butterfly valve 10, the engine operates like a compressor and an exhaust braking effect appears. The exhaust braking effect decreases as the butterfly valve 10 rotates in an opening direction from the fully-closed position. The butterfly valve 10 is connected by a mechanical linkage to a valve actuator 20.

The valve actuator 20 includes a housing 21, and a piston 22 supported for sliding movement within the housing 21 between a retracted position and an advanced position. The piston 22 defines first and second chambers 23 and 24 on the opposite sides thereof. The first chamber 23 is connected by a conduit 31 to a solenoid valve 30 which in turn is connected by a conduit 32 to an air tank 33. The air tank 33, which is connected to an air pump (not shown) and also to a pressure regulator (not shown), introduces a constant level of air pressure through the solenoid valve 30 into the first chamber 23 to move the piston 22 toward its advance position. A compression spring 25 is placed in the second chamber 24 to bias the piston 22 toward its retracted position. The piston 22 has an operation rod 26 secured at its one end for movement in unison therewith. The operation rod 26 is connected at the other end thereof to rotate the butterfly valve 10 within the exhaust passage 12. In the retracted position of the piston 22, the butterfly valve 10 fully opens the exhaust passage 12, and in the advanced position of the piston 22, the butterfly valve 10 fully closes the exhaust passage 12. The solenoid valve 30 operates in an on/off fashion on an electrical pulse signal fed thereto from a control unit 40 to adjust the air pressure charged in the second chamber 23 of the valve actuator 20. The degree to which the butterfly valve 10 closes the exhaust passage 12 and, thus, the strength of the exhaust braking is determined by the duty cycle of the electrical pulse signal applied from the control unit 40 to the solenoid valve 30.

The duty cycle (pulse-width) of the electrical pulse signal is repetitively determined from calculations performed in the control unit 40, these calculations being based upon various conditions of the automotive vehicle that are sensed during its operation. These sensed conditions include accelerator pedal position, brake pedal position and vehicle speed. Thus, an accelerator switch 41, a brake switch 42 and a vehicle speed sensor 43 are connected to the control unit 40. The accelerator switch 41 is associated with the accelerator pedal and it closes to supply current from the car battery (not shown) to the control unit 40 when the accelerator pedal is released, that is, when the throttle valve closes. The brake switch 42 is associated with the brake pedal and it closes to supply current from the car battery to the control unit 40 when the brake pedal is depressed to apply braking to the vehicle. The vehicle speed sensor 43 produces an electrical signal indicative of the vehicle speed. The control unit 40 may comprise a digital computer which includes a central processing unit (CPU), a random access memory (RAM), a read only memory (ROM) and an input/output control circuit (I/O). The central processing unit communicates with the rest of the computer via a data bus. The read only memory contains the program for operating the central processing unit and further contains appropriate data in look-up tables used in calculating appropriate values for the duty cycle of the control signal to the solenoid valve 30. A control word specifying a desired duty cycle is periodically transferred by the central processing unit and converted into a control signal for application to the solenoid valve 30.

Figure 2:
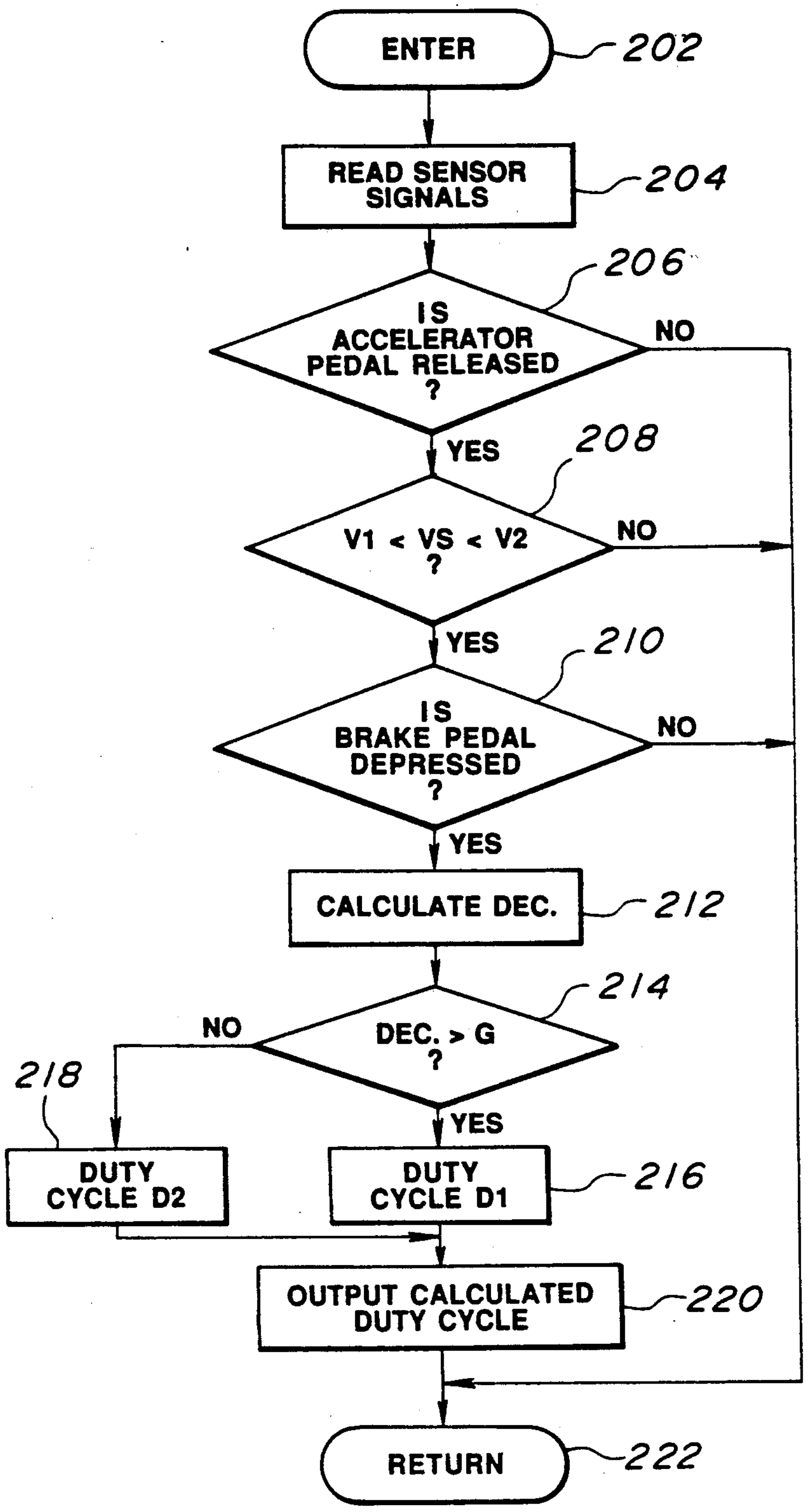
FIG. 2 is a flow diagram showing the programming of the digital computer used in the exhaust braking control apparatus of FIG. 1.

FIG. 2 is a flow diagram illustrating the programming of the digital computer as it is used to calculate a desired duty factor of the control signal applied to the solenoid valve 30. The computer program is entered at the point 202. At the point 204 in the program, the signals from the accelerator switch 41, the brake switch 42 and the speed sensor 43 are read into the computer memory. At the point 206 in the program, a determination is made as to whether or not the accelerator pedal is released. This determination is made based upon the signal read for the accelerator switch 41. If the answer to this question is "yes", then the program proceeds to the point 208. Otherwise, the program proceeds to the point 222 where the program is returned to the point 204. At the point 208 in the program, a determination is made as to whether or not the vehicle speed is in a predetermined range defined by lower and upper limits V1 and V2 predetermined as a function of vehicle transmission position. If the answer to this question is "yes", then the program proceeds to the point 210. Otherwise, the program proceeds to the point 222. At the point 210 in the program, a determination is made as to whether or not the brake pedal is depressed. This determination is made based upon the signal read for the brake switch 42. If the answer to this question is "yes", then it means that the operator intends to decelerate the vehicle when the vehicle speed is in the predetermined range and the program proceeds to the point 212. Otherwise, the program proceeds to the point 222.

At the point 212 in the program, the digital computer calculates the rate (vehicle deceleration) of speed reduction of the vehicle based upon the value read for the vehicle speed sensor 43. At the point 214, a determination is made as to whether or not the calculated vehicle deceleration is greater than a reference value G. Preferably, the reference value G is determined as a function of the existing vehicle speed. If the answer to this question is "yes", then the program proceeds to the point 216 where the digital computer sets a first predetermined value D1 for the duty cycle of the control signal to the solenoid valve 30. Otherwise, the program proceeds to the point 218 where the digital computer sets a second predetermined value D2 for the duty cycle of the control signal to the solenoid valve 30. The second duty cycle value D2 is greater than the first duty cycle value D1. At the point 220 in the program, the calculated duty cycle is transferred to the input/output control circuit. The input/output control circuit then sets the duty cycle (pulse-width) of the control signal to operate the solenoid valve 30. Following this, the program proceeds to the point 222 where the program is returned to the point 204.

When the calculated vehicle deceleration is greater than the reference value G, the digital computer sets the first, smaller duty cycle value D1. As a result, the solenoid valve 30 opens for a shorter time period in a predetermined time interval, causing the valve actuator 20 to move the butterfly valve 10 in an opening direction decreasing the exhaust braking effect. When the calculated vehicle deceleration is equal to or less than the reference value G, the digital computer selects the second, greater duty cycle value D2. As a result, the solenoid valve 30 opens for a longer time period in the predetermined time interval, causing the valve actuator 20 to move the butterfly valve 10 in a closing direction increasing the exhaust braking effect. Consequently, the vehicle deceleration is controlled to the reference value G The control unit 40 operates the solenoid valve 30 to provide a controlled degree of exhaust braking in response to a demand for vehicle deceleration. The control unit 40 sets the control valve 10 at a desired position between its fully-open position and its fully-closed position to provide a continuously variable degree of exhaust braking. The control unit 40 detects a demand for vehicle deceleration when the accelerator pedal is released and the brake pedal is depressed. Preferably, the control unit 40 is arranged to hold the solenoid valve 30 closed or inoperative when the vehicle speed is out of an appropriate range during vehicle deceleration. The control unit 40 holds the solenoid valve 30 closed or inoperative so as to retain the butterfly valve 10 at its fully-open position when the accelerator pedal is depressed, when the brake pedal is released, or when the vehicle speed is less than the predetermined value V1 or greater than the predetermined value V2.

While the duty cycle values D1 and D2 has been described as predetermined constant values, it is to be understood that they may be calculated as a function of vehicle speed or as a function of vehicle speed and vehicle deceleration.

Figure 3:
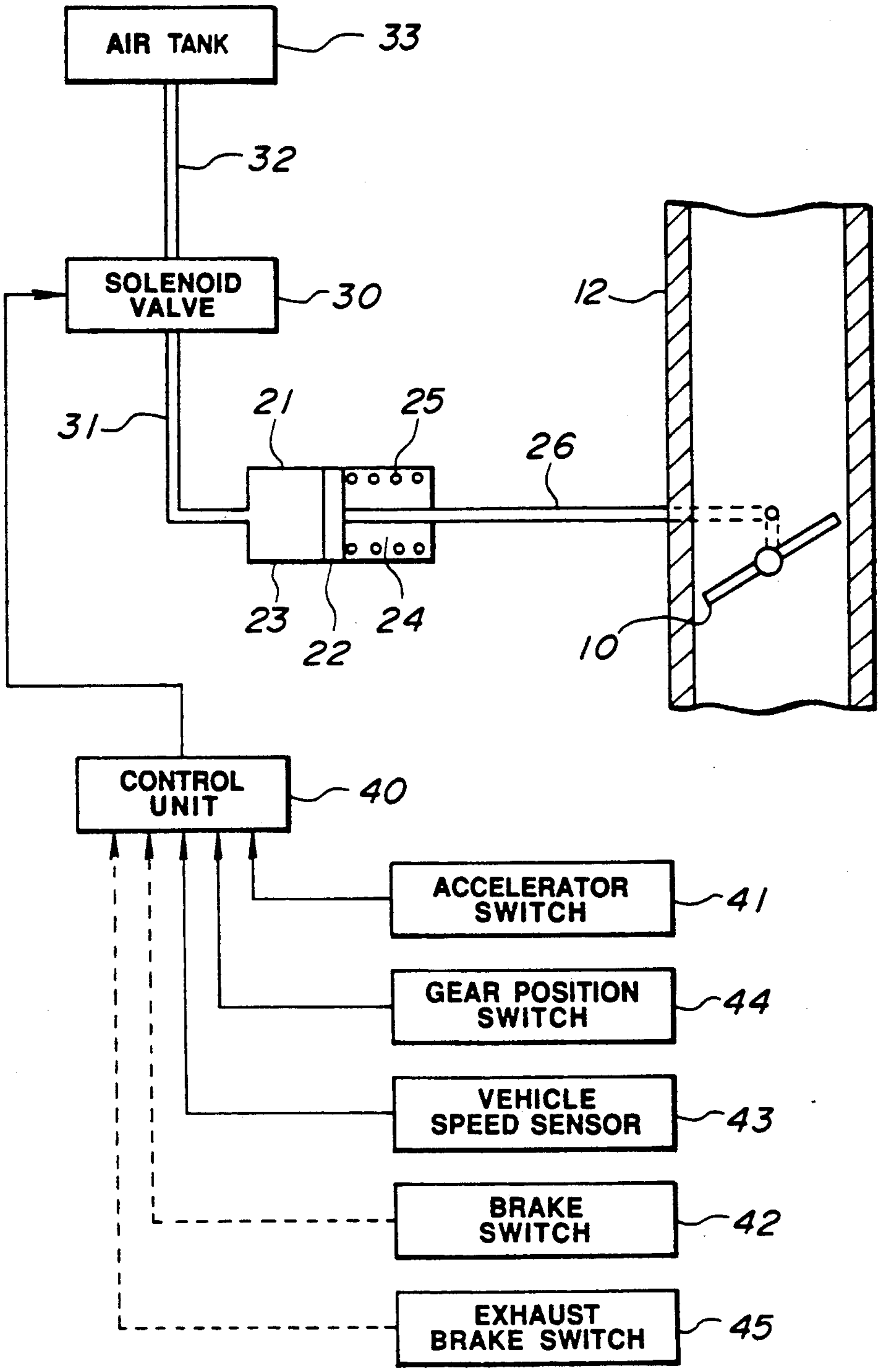
FIG. 3 is a schematic diagram showing a second embodiment of the exhaust braking control apparatus of the invention.

Referring to FIG. 3, a second embodiment of the exhaust braking control apparatus of the invention is illustrated with the same elements being designated by the same reference numerals. In FIG. 3, the numeral 44 designates a transmission gear position switch which closes to supply current from the car battery to the control unit 40 when the transmission is in low gear or the like for engine braking, and the numeral 45 designates an exhaust brake switch which is manually closed to supply current from the car battery to the control unit so as to indicate an operator's demand for exhaust braking.

Figure 4:
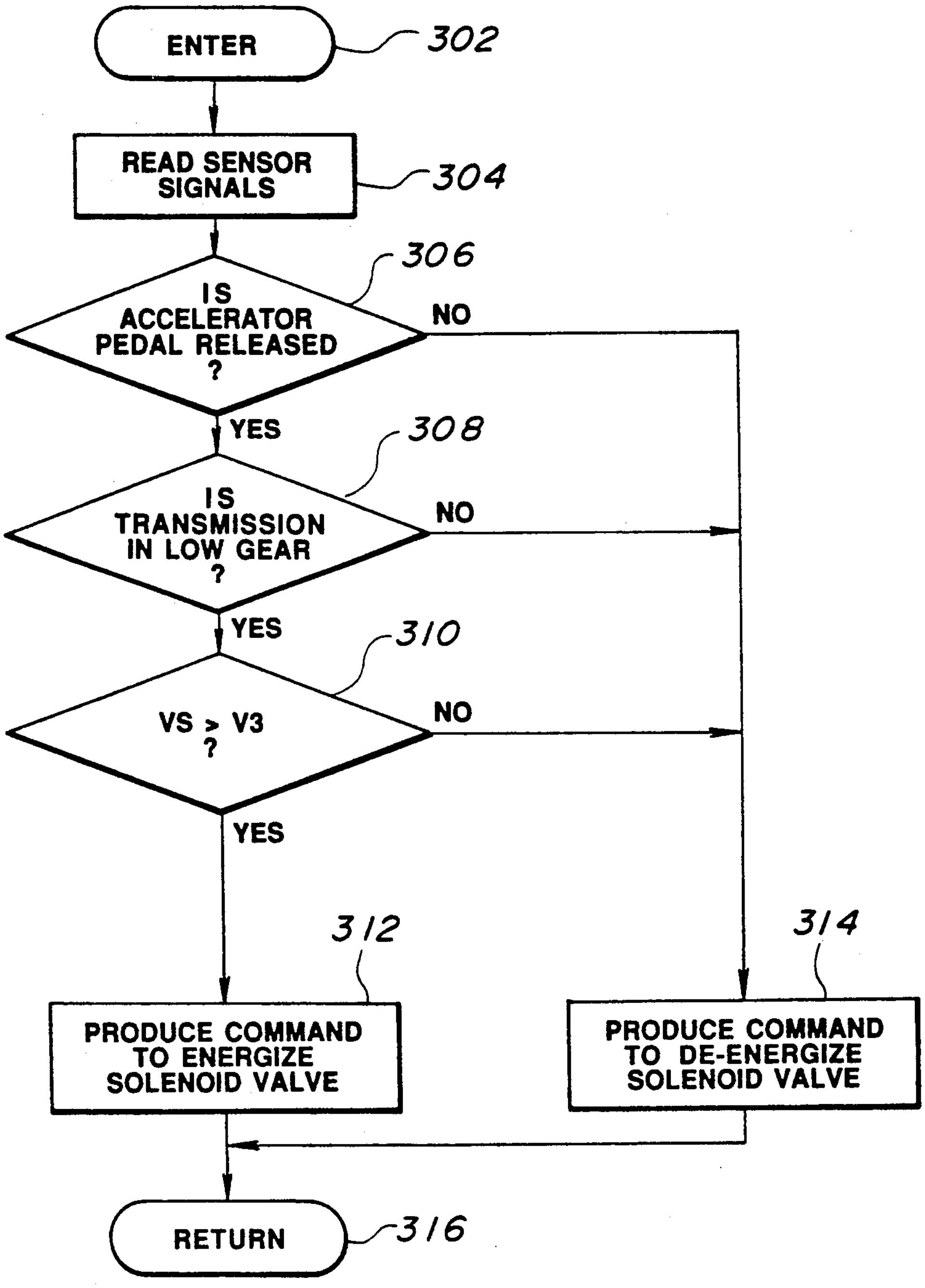
FIG. 4 is a flow diagram showing the programming of the digital computer used in the exhaust braking control apparatus of FIG. 3.

FIG. 4 is a flow diagram illustrating the programming of the digital computer as it is used to check vehicle operating conditions for solenoid valve operation. The computer program is entered at the point 302. At the point 304 in the program, the signals from the accelerator switch 41, the vehicle speed sensor 43 and the transmission gear position switch 44 are read into the computer memory. At the point 306 in the program, a determination is made as to whether or not the acceleration pedal is released to move the throttle valve toward its fully-closed position. This determination is made based upon the signal read for the accelerator switch 41. If the answer to this question is "yes", then the program proceeds to the point 308. Otherwise, the program proceeds to the point 314. At the point 308 in the program, a determination is made as to whether or not the transmission is in low gear. This determination is made based upon the signal read for the transmission gear position switch 44. If the answer to this question is "yes", then the program proceeds to the point 310. Otherwise, the program proceeds to the point 314. At the point 310 in the program, a determination is made as to whether or not the vehicle speed VS is greater than a predetermined value V3. This determination is made based upon the signal read for the vehicle speed sensor 43. If the answer to this question is "yes", then the program proceeds to the point 312 where a command is produced to energize the solenoid valve 30 so as to move the butterfly valve 10 in a closing direction and then to the point 316 where the program is returned to the point 304. Otherwise, the program proceeds to the point 314 where a command is produced to de-energize the solenoid valve 30 so as to move the butterfly valve 10 in an opening direction.

The control unit 40 energizes the solenoid valve 30 to move the butterfly valve 10 in a closing direction so as to provide exhaust braking only when the accelerator pedal is released, the transmission is in low gear or the like for exhaust braking, and the vehicle speed exceeds a predetermined value.

Figure 5:
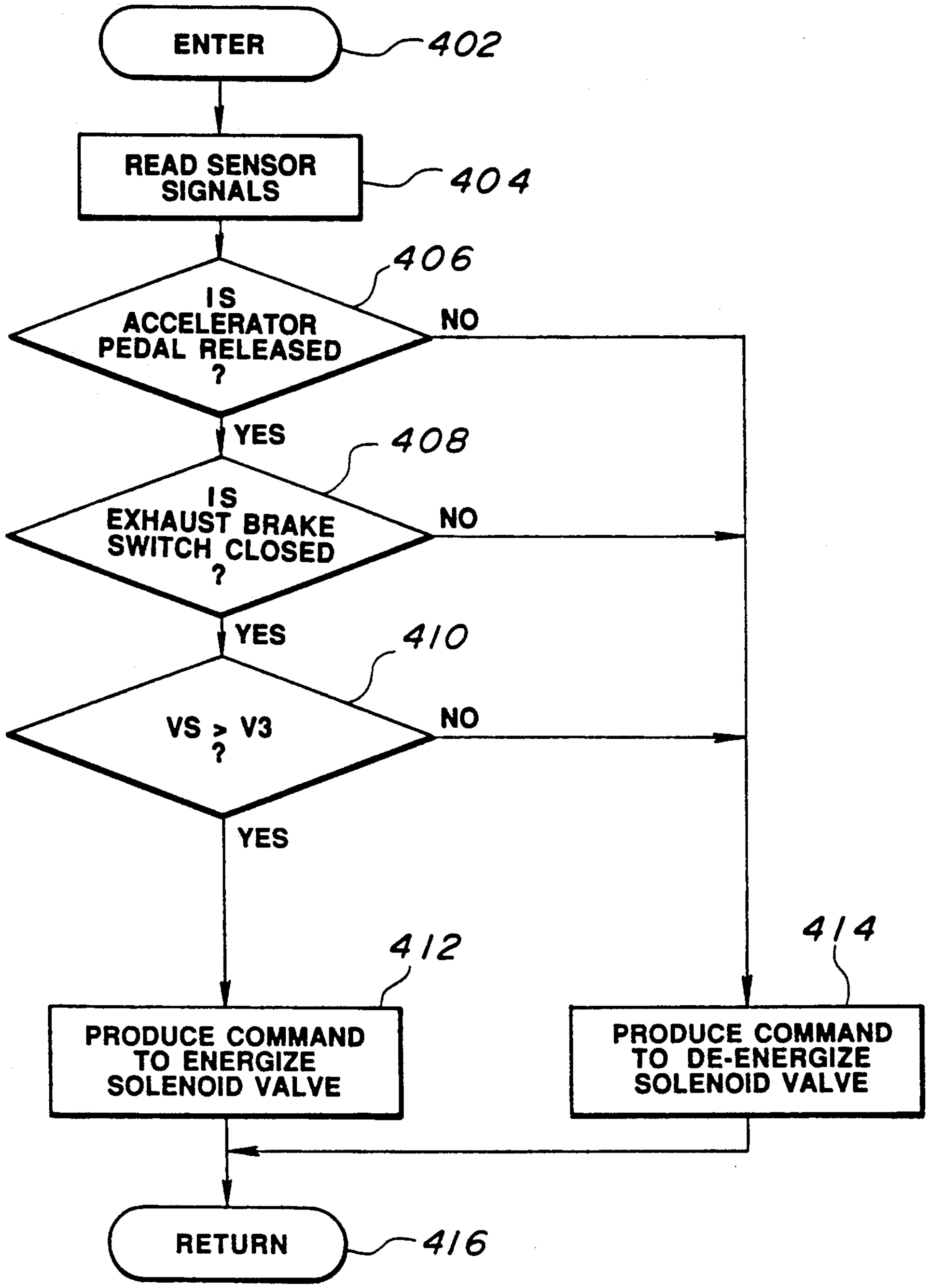
FIG. 5 is a flow diagram showing a modified form of the programming of the digital computer used in the exhaust braking control apparatus of FIG. 3.

FIG. 5 is a flow diagram illustrating a modified form of the programming of the digital computer as it is used to check vehicle operating conditions for solenoid valve operation. The computer program is entered at the point 402. At the point 404 in the program, the signals from the accelerator switch 41, the vehicle speed sensor 43 and the exhaust brake switch 45 are read into the computer memory. At the point 406 in the program, a determination is made as to whether or not the acceleration pedal is released to bring the throttle valve to its fully-closed position. This determination is made based upon the signal read for the accelerator switch 41. If the answer to this question is "yes", then the program proceeds to the point 408. Otherwise, the program proceeds to the point 414. At the point 408 in the program, a determination is made as to whether or not the exhaust brake switch 45 is closed. This determination is made based upon the signal read for the exhaust brake switch 45. If the answer to this question is "yes", then the program proceeds to the point 410. Otherwise, the program proceeds to the point 414. At the point 410 in the program, a determination is made as to whether or not the vehicle speed VS is greater than a predetermined value V3. This determination is made based upon the signal read for the vehicle speed sensor 43. If the answer to this question is "yes", then the program proceeds to the point 412 where a command is produced to energize the solenoid valve 30 so as to move the butterfly valve 10 in a closing direction and then to the point 416 where the program is returned to the point 404. Otherwise, the program proceeds to the point 14 where a command is produced to de-energize the solenoid valve 30 so as to move the butterfly valve 10 in an opening direction and then to the point 416.

The control unit 40 energizes the solenoid valve 30 to move the butterfly valve 10 in a closing direction so as to provide exhaust braking only when the accelerator pedal is released, the exhaust brake switch is closed to indicate an operator's demand for exhaust braking, and the vehicle speed exceeds a predetermined value.

Figure 6:
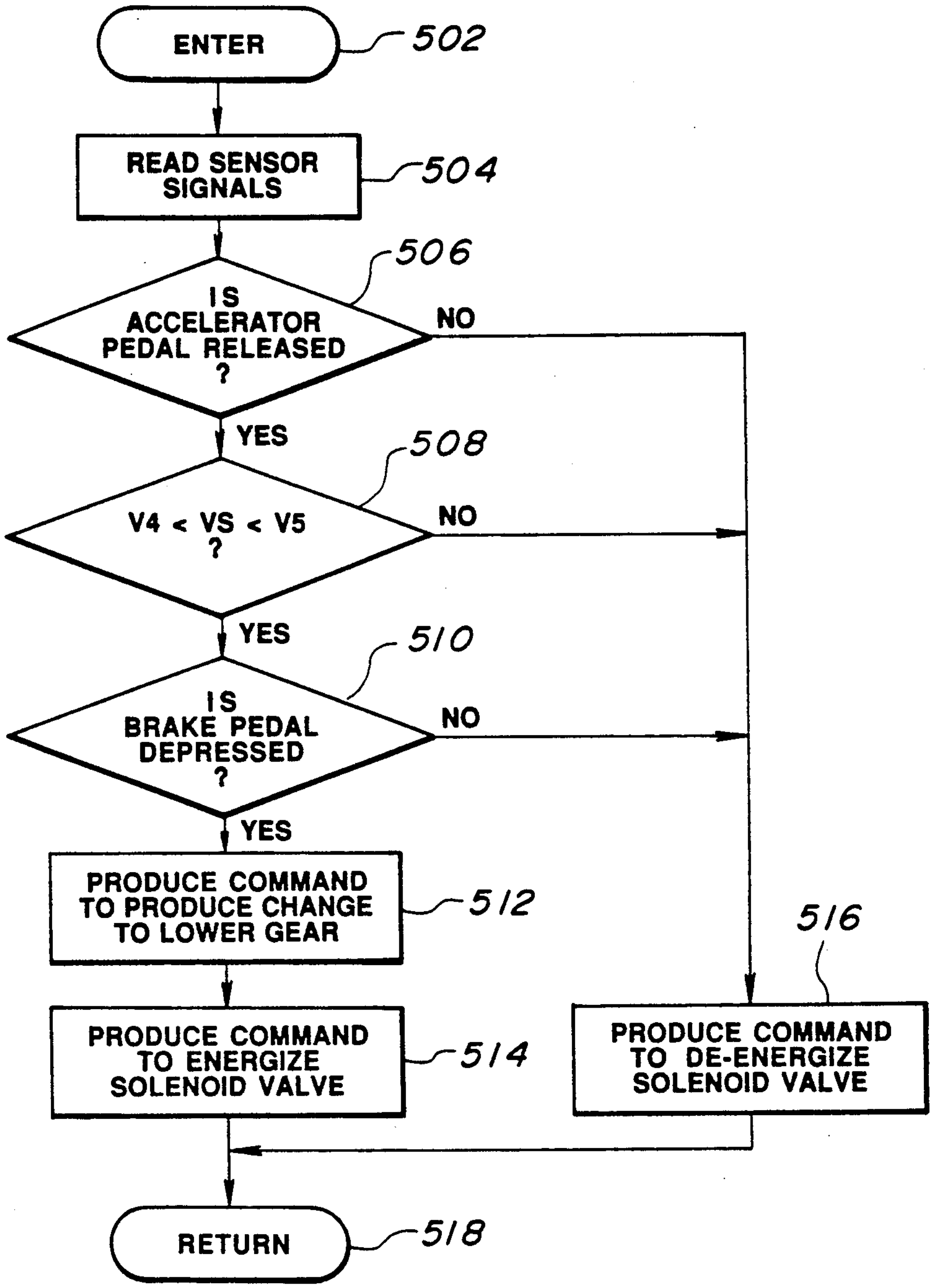
FIG. 6 is a flow diagram showing another modified form of the programming of the digital computer used in the exhaust braking control apparatus of FIG. 3.

FIG. 6 is a flow diagram illustrating another modified form of the programming of the digital computer as it is used to control the solenoid valve 30 on and off. The computer program is entered at the point 502. At the point 504 in the program, the signals from the accelerator switch 41, the brake switch 42 and the vehicle speed sensor 43 are read into the computer memory. At the point 506 in the program, a determination is made as to whether or not the acceleration pedal is released to bring the throttle valve to its fully-closed position. This determination is made based upon the signal read for the accelerator switch 41. If the answer to this question is "yes", then the program proceeds to the point 508. Otherwise, the program proceeds to the point 516. At the point 508 in the program, a determination is made as to whether or not the vehicle speed VS is in a predetermined range defined by predetermined upper and lower limits V4 and V5. This determination is made based upon the signal read for the vehicle speed sensor 43. If the answer to this question is "yes", then the program proceeds to the point 510. Otherwise, the program proceeds to the point 516. At the point 510 in the program, a determination is made as to whether or not the brake pedal is depressed. This determination is made based upon the signal read from the brake switch 42. If the answer to this question is "yes", then the program proceeds to the point 512 where the digital computer produces a command causing the transmission produces a change to a lower gear. Following this, the program proceeds to the point 514 where the digital computer produces a command to energize the solenoid valve 30 so as to move the butterfly valve 10 in a closing direction and then to the point 518 where the program is returned to the point 504. If the brake pedal is depressed, then the program proceeds from the point 510 to the point 516 where a command is produced to deenergize the solenoid valve 30 so as to move the butterfly valve 10 in an opening direction and then to the point 518.

The control unit 40 energizes the solenoid valve 30 to move the butterfly valve 10 in a closing direction so as to provide exhaust braking only when the accelerator pedal is released, the vehicle speed is in a predetermined range, and the brake pedal is depressed.

While the reference values V3, V4 and V4 have been described as constant values, it is to be understood that these values may be determined as a function of transmission gear position.

According to this embodiment, the control unit 40 permits exhaust braking application only for predetermined vehicle operating conditions. It is, therefore, possible to ensure freedom from unnecessary exhaust braking application which would cause engine stall.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. An exhaust braking control apparatus for use with an automotive vehicle having an engine, and an exhaust passage through which exhaust gases are discharged from the engine to the atmosphere, comprising:

a control valve situated for movement between a fullyopen position and a fully-closed position within the exhaust passage to control exhaust gas flow through the exhaust passage;

sensor means, including sensors sensitive to vehicle operating conditions, for providing sensor signals indicative of sensed vehicle operating conditions; and a control unit coupled to the sensor means for setting the control valve at a position to provide a continuously variable degree of exhaust braking effect based upon the sensed vehicle operating conditions, the control unit including means for setting the control valve at a position to provide a predetermined vehicle deceleration.

2. The exhaust braking control apparatus as claimed in claim 1, wherein the control unit includes first means for producing a command signal based upon the sensed vehicle operating conditions, and a second means responsive to the command signal for setting the control valve at a position to provide a controlled degree of exhaust braking effect.

3. The exhaust braking control apparatus as claimed in claim 2, wherein the automotive vehicle includes an accelerator pedal and a brake pedal, and wherein the first means includes means for producing a first signal indicative of the sensed vehicle speed being within a predetermined range, a second signal indicative of the accelerator pedal being released and a third signal indicative of the brake pedal being depressed, and means responsive to the first, second and third signals for producing the command signal.

4. An exhaust braking control apparatus for use with an automotive vehicle having an engine, and an exhaust passage through which exhaust gases are discharged from the engine to the atmosphere, comprising:

a control valve situated for movement between a fully-open position and a fully-closed position within the exhaust passage to control exhaust gas flow through the exhaust passage;

sensor means, including sensors sensitive to vehicle operating conditions, for providing sensor signals indicative of sensed vehicle operating conditions; and a control unit coupled to the sensors for setting the control valve at a position to provide a continuously variable degree of exhaust braking effect based upon the sensed vehicle operating conditions, the control unit including means for setting the control valve at a position to provide a vehicle deceleration determined as a function of vehicle speed.

5. The exhaust braking control apparatus as claimed in claim 4, wherein the control unit includes first means for producing a command signal based upon the sensed vehicle operating conditions, and a second means responsive to the command signal for setting the control valve at a position to provide a controlled degree of exhaust braking effect.

6. The exhaust braking control apparatus as claimed in claim 5, wherein the automotive vehicle includes an accelerator pedal and a brake pedal, and wherein the first means includes means for producing a first signal indicative of the sensed vehicle speed being within a predetermined range, a second signal indicative of the accelerator pedal being released and a third signal indicative of the brake pedal being depressed, and means responsive to the first, second and third signals for producing the command signal.

7. An exhaust braking control apparatus for use with an automotive vehicle having an engine, and an exhaust passage through which exhaust gases are discharged from the engine to the atmosphere, comprising:

a control valve situated for movement between a fully-open position and a fully-closed position within the exhaust passage to control exhaust gas flow through the exhaust passage;

sensor means, including sensors sensitive to vehicle operating conditions, for providing sensor signals indicative of sensed vehicle operating conditions, the sensors including a vehicle speed sensor sensitive to vehicle speed for producing a signal indicative of a sensed vehicle speed; and a control unit coupled to the sensors for setting the control valve at a position to provide a continuously variable degree of exhaust braking effect based upon the sensed vehicle operating conditions, the control unit including means for calculating a vehicle deceleration based upon the sensed vehicle speed indication signal, means for calculating a reference value for the vehicle deceleration as a function of the sensed vehicle speed, and means for moving the control valve in a direction bringing the calculated vehicle deceleration closer to the reference value.

8. The exhaust braking control apparatus as claimed in claim 7, wherein the control unit includes means for comparing the calculated vehicle deceleration with the reference value, means for moving the control valve in a closing direction when the calculated vehicle deceleration is less than the reference value, and means for moving the control valve in an opening direction when the calculated vehicle deceleration exceeds the reference value.

9. The exhaust braking control apparatus as claimed in claim 7, wherein the control unit includes first means for producing a command signal based upon the sensed vehicle operating conditions, and a second means responsive to the command signal for setting the control valve at a position to provide a controlled degree of exhaust braking effect.

10. The exhaust braking control apparatus as claimed in claim 9, wherein the automotive vehicle includes an accelerator pedal and a brake pedal, and wherein the first means includes means for producing a first signal indicative of the sensed vehicle speed being within a predetermined range, a second signal indicative of the accelerator pedal being released and a third signal indicative of the brake pedal being depressed, and means responsive to the first, second and third signals for producing the command signal.

* * * * *